May 27, 1969

KIYOSHI INOUE 3,446,718

CHEMICAL SYNTHESIS

Filed Sept. 25, 1964

INVENTOR
KIYOSHI INOUE
BY
Karl F. Ross
AGENT

United States Patent Office 3,446,718
Patented May 27, 1969

3,446,718
CHEMICAL SYNTHESIS
Kiyoshi Inoue, Tokyo, Japan
(100 Sakato, Kawasaki, Kanagawa, Japan)
Continuation-in-part of application Ser. No. 356,715, Apr. 2, 1964. This application Sept. 25, 1964, Ser. No. 399,243
Claims priority, application Japan, Oct. 26, 1963, 38/57,171; Nov. 6, 1963, 38/59,983
Int. Cl. B01d 1/00
U.S. Cl. 204—59         28 Claims

ABSTRACT OF THE DISCLOSURE

Method of and apparatus for the synthesis of organic chemical compounds wherein a liquid vehicle containing an organic compound is directed in a high-velocity jet against an impacting body while a pair of electrodes are energized with a unidirectional (D.C.) and an activating alternating potential for collection of the product and partial contribution to the dissociation of the material contained in the jet.

My present invention relates to chemical synthesis and, more particularly, to the synthesis of organic compounds.

In my copending application Ser. No. 356,715, filed Apr. 2, 1964 and entitled "Molecular Synthesis", (now U.S. Patent 3,330,746 issued July 11, 1967) I describe systems in which electrical energy is employed to produce molecular entities and chemical compounds and having various characteristics which render the use of high-energy electrical fields particularly advantageous. The present invention is a continuation-in-part of the aforementioned copending application and has as its principal object the extension of the principles set forth therein.

It is commonly known that one of the disadvantages of electrolytic systems for the production of inorganic compounds, free metals and their salts is that they require the presence of an electrolyte containing anions or cations of a starting material which are undesirable in the final product. The quantity of such undesirable ions is further increased when compounds are added to improve the conductivity of the electrolytic medium or to modify the form in which the electrolytically-produced compound is deposited. In my above-identified copending application I have pointed out that these disadvantages can be avoided by the synthesis of chemical compounds, especially inorganic compounds, which involves the disposition of a starting substance having an ionizable component (e.g. an element or compound ion), whose combination with another material is desired, in an electric field having an unidirectional component adapted to effect a drift of the ionizable component toward one of the poles of the field. The system makes use of a vehicle which need not be a liquid or an electrolyte in the normal sense since it does not disperse freely ionizable compounds although it does permit the preferential drift of ions under the action of the electric field, the material with which the ion is to combine being disposed along its path. An important feature of this earlier disclosure resides in the provisions of a homogenous conductive medium to form the drift path, this meduim being capable, at most, of only partly solubilizing the starting substance. Thus, this system is distinct from arrangements wherein electrodialysis results in the selective passing of ions through a membrane in the presence of an electrolyte. The electrolyte and membrane of such systems constitute a heterogenous drift path between the electrodes. Moreover, since the conductive medium forming the drift path is not an electrolyte in the sense that it is capable of ionizing the starting compound by dissolving it in a quiescent state, it was considered an important aspect of the invention that the electric field include a high-frequency component, preferably accompanied by spark discharge which was capable of effectively ionizing the starting material so that ionic drift could occur.

The aforementioned copending application also disclosed the production of organic compounds and the synthesis of organic molecules with the aid of a high-energy electric field. The electric field included a high-frequency component which, it was believed, was in resonance with one or more vibrational modes of relatively long-chain carbon molecules, thereby causing fragmentation of the latter with possible ionization whereby the ionized fragments tended to drift toward one of the electrodes and recombine at the latter.

The molecules may, moreover, be presumed to be raised to an activated state by the high-frequency energizing current, thereby resulting in bond rupture with possible ionization or free-radical formation. In any event, the liquid medium appears to contain charged fragments of an organic molecule or electrically charged unfragmented organic particles which drift under the influence of an unidirectional-field component to one of the electrodes, e.g. the cathode, and are chemically combined there with other fragments or charged particles to produce organic compounds different from those originally introduced into the medium. As disclosed in my copending application mentioned above, the newly formed organic compound can be a polymer having characteristics of the polyvinyl halides and characterized by linear structures with, however, considerable crosslinking.

The energizing electric current can be at a high frequency so selected as to be a harmonic of the characteristic frequency of a vibrational mode of the molecule; the algebraic sum of two or more superimposed characteristic frequencies may also be employed. In the production of polymers from carbohydrates, e.g. maltose, the medium can contain 1% by weight urea and be a 50% aqueous solution of potassium acetate saturated with the carbohydrate, a frequency of 30 kilocycles/sec. to 30 megacycles/sec. is employed.

A more specific object of the invention is to provide a method of synthesizing organic compounds exploiting high energies to eliminate time-consuming and expensive intermediate steps in the chemical production of these compounds and thereby avoid the necessity of separating intermediates only to react them subsequently.

Still another object of this invention is to provide an improved method of synthesizing both low- and high-molecular-weight organic compounds.

These objects and others which will become apparent hereinafter, are attained, in accordance with the present invention, by a method of producing organic compounds which comprises the steps of introducing an organic compound into a liquid medium so that molecules of this compound are available to react with other molecules of the same compound or molecules of a different organic compound, and then subjecting the liquid containing these molecules to a high-energy force field adapted to promote a reaction between the molecules. I have discovered that this force field can be electrical or kinetic in character, that is provided by an electric field developed between electrodes and/or produced by the impact or kinetic energy of the liquid moving at high velocity. The resulting reaction between two species A and B, both of which are predominantly organic, can be of the additive type to produce a compound AB or of the type wherein either A or B strips a functional group or organic fragment from the other. The reaction can be catalyzed by the catalysts conventionally used for carrying out the reaction in a succession of steps and may be effected in the presence of dehydrating agents etc.

By way of example of the principles of the present invention, it can be noted that a common method of producing methyl methacrylate is to react acetone with hydrogen cyanide and then convert the resulting nitryl into a ethylenically unsaturated compound which is hydrolyzed and then esterified in accordance with the following sequence of reactions, all of which must be carried out separately

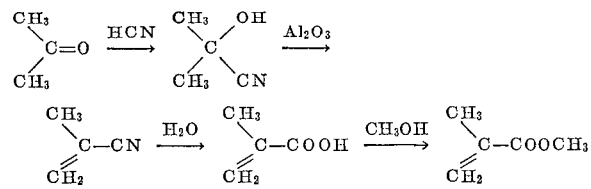

In accordance with the present invention, using electrical energy and/or the kinetic energy of a moving solution of acetone and hydrogen cyanide, the reaction can be characterized as

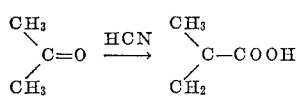

the methacrylic acid can then be esterified to yield methyl methacrylate.

Similarly, the reaction of benzene with propylene in the presence of hypophosphoric acid yields

which can be further reacted to yield phenol and acetone in a series of distinct synthesis steps. All these intermediate steps can be eliminated by reacting the benzene with propylene in the presence of a high-energy field, thereby producing phenol and acetone directly. Similarly, styrene can be produced directly from benzene and ethylene without isolating $C_6H_5$—$C_2H_5$ as an intermediate. These synthesis steps in which molecules are built up from smaller molecules present in the medium with the aid of high-energy fields are not unlike the system disclosed earlier wherein high polymers can be produced from relatively high-molecular-weight compounds such as carbohydrates, presumably through activation or fragmentation thereof.

According to another aspect of the present invention, an apparatus for the synthesis of chemical compounds as described above includes a pair of spaced-apart electrodes by means of which the liquid medium can be subjected to a high-energy electric field and/or means for obtaining a highkinetic energy from the liquid. The latter means can include one or more nozzles capable of producing a jet of the liquid impinging upon some objects or body whereby the kinetic energy of the moving particles can be exploited to activate the molecules entrained thereby. Thus the jet can be directed against a stationary or moving object which may, if desired, be one of the electrodes or against a body of liquid or even an oppositely directed jet capable of exploiting the kinetic energy of the moving stream. The apparatus may include means for introducing one or more components of the reaction system in a gaseous phase.

The above and other objects, features and advantages of the present invention will become more readily apparent from the following description and specific examples, reference being made to the accompanying drawing in which.

Figure 1:
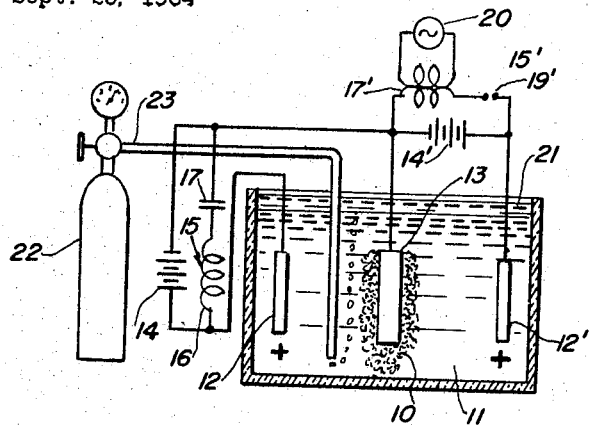
FIG. 1 is a diagrammatic cross-sectional view illustrating an apparatus for the formation of organic polymeric materials.

In the arrangement illustrated in FIG. 1, a polymeric mass 10 is produced by subjecting a solution 11 of a carbohydrate to a high-energy electric fiield between a pair of anodes 12, 12′ and a common cathode 13. The direct-current component of the electric field is obtained from a pair of batteries 14, 14′ bridged across the respective anodes 12, 12′ and the cathode 13. The high-frequency network 15, which also produces a spark discharge capable of fragmenting molecules in the solution, consists of an inductor 16 and a capacitor 17. The network is connected in parallel with the battery 14 while the inductance 17′ of a comparable network 15′ associated with the battery 14′ works into a spark gap 19′. A high-frequency alternating current source 20 is inductively coupled with network 15′. An antioxidation layer 21 of an oil is disposed above the solution 11 to limit oxidation of this electrolyte and the materials dispersed therein. A tank 22 of chlorine gas and a bubbler pipe 23 are also provided to pass chlorine through the solution 11 in the region of the cathode 13.

EXAMPLE I

Figure 2:
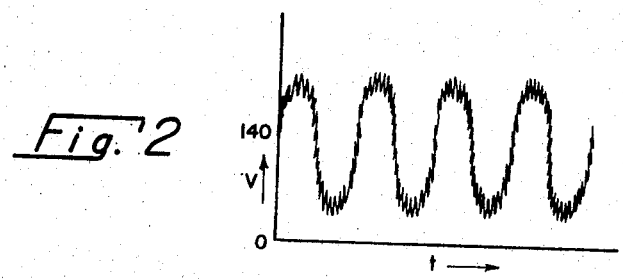
FIG. 2 is a graph of the activating potential developed across electrode thereof.

Using the apparatus illustrated in FIGURE 1, a precipitate 10, consisting of a translucent polymer, having high tensile strength and heat resistance with a relatively small optical absorption, was obtained when the cathode 13 was composed of copper and had a diameter of about 6 mm. The electrolyte is a 50% aqueous solution of potassium acetate and is saturated with 30% by weight maltose, contains 1% by weight urea and is covered by a weight layer of machine oil equal to 10% of the solution. The anodes are composed of stainless steel and a frequency of 30 kc./sec. to 3 mc./sec. is developed between the anodes 12, 12′ and the cathode 13. The potential of the D.C. component was 140 volts. The amplitude of the A.C. component was approximately 20 volts with a peak current of 3 amp. A temperature of about 40° C. is developed in the tank although the temperature in the vicinity of the cathode reaches about 100° C. As long as long-chain molecules are present, a polymeric precipitate having an indeterminate molecular weight ranging upwardly of about 4000 is produced. When only the A.C. frequency is employed, however, the efficiency of the apparatus falls sharply and a reduced quantity of polymer is obtained relative to the energy used. It has been found to be possible to substitute highly negative ions for other functional groups and/or hydrogen atoms on the resulting polymer by introducing such ions into the solution and causing them to migrate toward the cathode. The polymer was chlorinated by bubbling chlorine from the tank 22 through the bath at the rate of about 30 cc./min. The polymer was found to be almost totally chlorinated after this operation and bore a remarkable resemblance to polyvinyl chloride. When nickel was substituted for the copper electrode, similar results were obtained although substitution of an inert electrode, such as stainless steel, resulted in a reduction of the yield, thereby indicating that copper and nickel are catalytically active in effecting the chemical combination. From FIG. 2 it may be seen that a spark discharge superimposes itself on the basic alternating-current energizing field and has a frequency in excess of this basic A.C. While the role of the spark discharge is not fully understood, it should be noted that the polymer is not formed nearly as readily in the absence of the spark. Apparently, the impulsive nature of the discharge facilitates the fragmentation of the large molecule and permits the fragments to be electrically drawn toward the cathode for recombination into a larger molecular unit.

Figure 3:
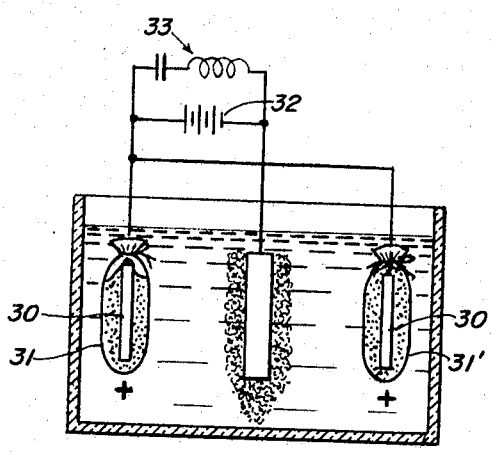
FIG. 3 is a view similar to FIG. 1 according to a modification of this invention.
Figure 4:
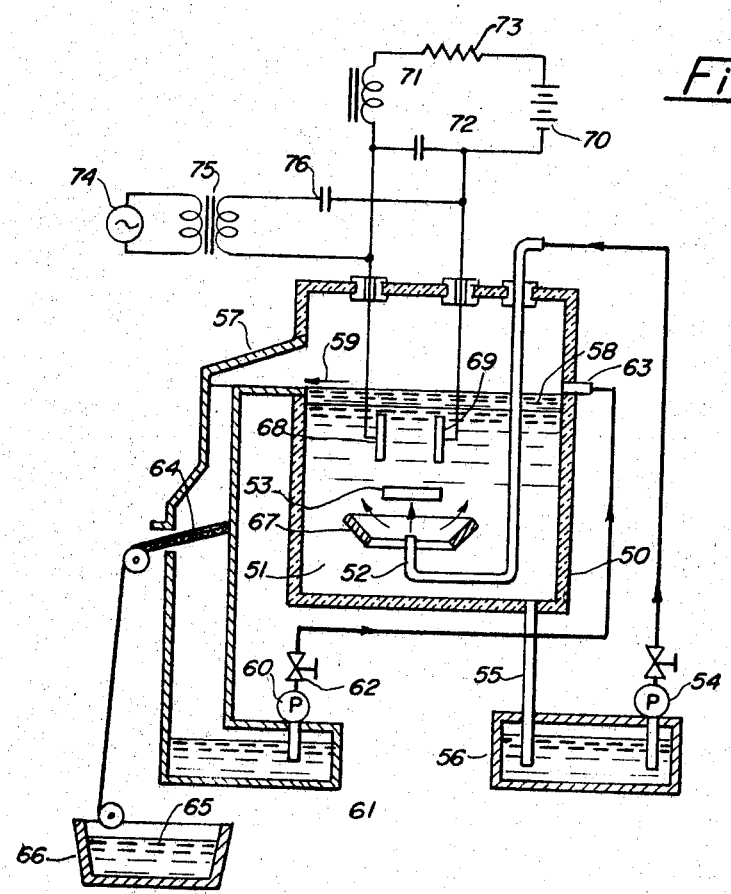
FIG. 4 is a view similar to FIG. 1 of another apparatus for synthesizing organic compounds wherein electric energy is supplemented by the kinetic energy of a moving stream of the liquid medium.

The apparatus of FIG. 3 is essentially similar to that of FIG. 4 with the exception that the anodes 30, 30' are surrounded by permeable bags 31, 31' containing calcium fluoride.

EXAMPLE II

Using the parameters and materials of Example I but with calcium fluoride disposed at the anodes 30, 30' of the apparatus of FIG. 3 and the chlorine-gas feed means dispensed with, a high-molecular-weight polymer, containing bonded fluorine, was produced. The product resembled polytetrafluorethylene although it did not have complete substitution of fluorine for hydrogen. Additional characterization of the fluocarbon was impossible as a consequence of its complexity.

EXAMPLE III

A fluocarbon, having a molecular weight of approximately 36,000, and generally similar to that obtained by Example II, was produced when, in an apparatus of the type illustrated in FIG. 3, the liquid electrolyte was replaced by an intimate mixture of calcium fluoride and dry sugar. In this case the polymer was washed free from adherent sugar in a subsequent step. In the apparatus of FIG. 3 a single spark generator 33 is employed in conjunction with the battery 32 and a frequency of about 90 kc./sec. was superimposed on the unidirectional current. The fluorine content of the polymer was found to be 0.9% by weight (iodine value=56).

In FIG. 4, I show another apparatus for this production of polymeric materials wherein the vessel 50 contains the liquid 51 which is subjected to a high-energy electric field and high-kinetic energy impact for purposes of activation. The liquid 51 is introduced via a nozzle 52, directed at a stainless-steel plate 53 and supplied with fluid via a pump 54. A return tube 55 carries excess liquid from the reaction vessel 50 to a storage tank 56. The polymer, when formed, floats to the surface of the bath 51 and can be carried off through an outlet 57 via a stream of oil 58 or other medium, whose specific gravity is less than that of the bath, flowing in the direction of arrow 59 and overlying the bath 51. This layer also prevents oxidation of the components of bath 51. The product-removal stream is supplied by a pump 60 from a reservoir 61 via a valve 62 and an inlet 63 above the surface of bath 51. From the outlet 57, the polymer is carried onto a screen or filter 64 from which it is conveyed to a bath of solvent 65 with which the polymer can be extracted or simply to a connecting vessel 66. The product-removal liquid passes the screen 64 and enters the collecting vessel 61. A frustoconical deflecting ring 67 is provided in the region of nozzle 52, coaxially therewith, to direct upwardly the stream rebounding from impact plate 53. A pair of electrodes 68, 69 are spaced apart (e.g. by a distance of 30 mm.) above the impact plate 67, which can be about 1 mm. away from the nozzle, to provide a high-energy electric field.

The direct-current component of this field is provided by a D.C. source 70 represented by a battery across which a discharge network-consisting of an inductance 71, a capacitance 72 and a series resistance 73 (i.e. the resistive impedance of the circuit) is connected. This discharge network can be employed to produce a spark discharge or a high-energy impulsive current. A high-frequency alternating current can also be applied to the electrodes 68, 69 by the A.C. source 74, via a coupling transformer 75 and a D.C. blocking capacitor 76.

Figure 5:
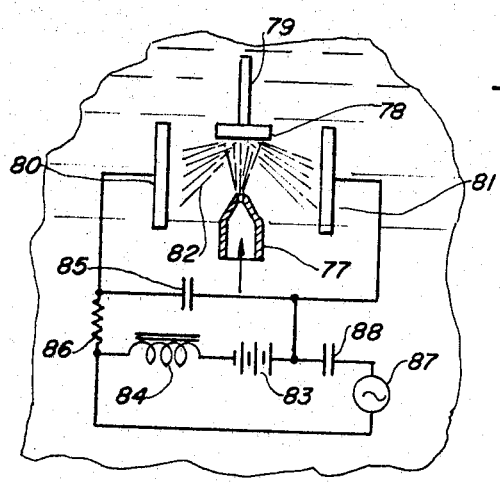
FIG. 5 is a fragmentary cross-sectional view of another apparatus of this general type.

In FIG. 5, I show a modified arrangement for employing the kinetic energy of impact of a stream emerging from the nozzle 77. In this case, the impact plate 78 is mounted upon a shaft 79 adapted to be rotated at elevated speeds (e.g. on the order of thousands of revolutions per minute) during impact of the stream therewith. The electrodes 80, 81 are disposed laterally of the impact zone in the path of the deflected streams 82 of liquid so that also the electrodes act as impact plates. The battery 83 provides the D.C. component of the electric field and is connected in series with inductance 84, capacitor 85 and resistor 86 as described with reference to FIG. 4. The high-frequency component is derived from the A.C. source 87 and applied to the electrodes via a D.C.-blocking capacitor 88.

Figure 6:
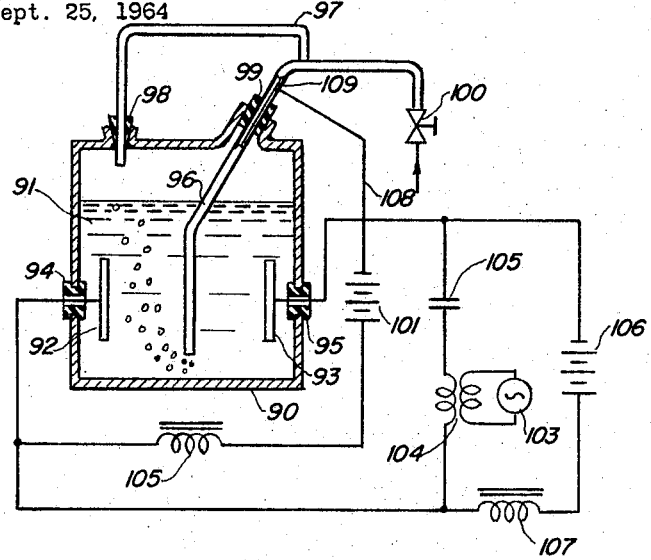
FIG. 6 is a cross-sectional view through a system wherein one of the reactants is a gas.

In the system of FIG. 6, one of the reactants is introduced as a gas. The vessel 90 thus contains a liquid-reaction medium 91 which can also enter the reaction as will be evident hereinafter. A pair of electrodes 92, 93 are disposed in the bath 91 below the surfaces thereof and have leads traversing feed-through insulators 94, 95 in this vessel. The gaseous reactant is introduced through a bubbler tube 96 below the surface of the liquid with excess gas being returned to the bubbler tube by a circulating system diagrammatically represented by the tube 97. The vessel 90 is sealed by stoppers 98, 99 to prevent escape of the gas. A valve 100 is provided in the gas line to control the rate of flow. A high-voltage D.C. field is provided bewteen the conductive bubbler tube 96 and one of the electrode plates 92 by a battery 101 in series with an inductance 102 for ionizing the gaseous medium as described below. The high-frequency alternating current field is applied across the electrodes 92, 93 via a high-frequency A.C. source 103, inductively coupled with the electrodes via a transformer 104 whose secondary winding is connected in series with a D.C.-blocking capacitor 105. The D.C. field component across the electrodes is supplied by the battery 106 in series with inductance 107. The electrodes 92, 93 may be composed of stainless steel while the gas can be hydrogen cyanide, propylene, ethylene, etc. as indicated hereinafter. The D.C. field between the interior of the tubular tube 96 and electrode 92 is at a potential advantageously above the breakdown voltage of the gas passing therethrough so that a discharge-type or corona ionization occurs within this tube. For this purpose, the negative terminal of battery 101 is connected by lead 108 to a thin pin or discharge electrode 109 insulatingly disposed within the tube. A voltage gradiant of $10^3$ to $10^5$ v./cm. is preferably generated within this bubbler tube to produce the ionization breakdown desired.

Figure 7:
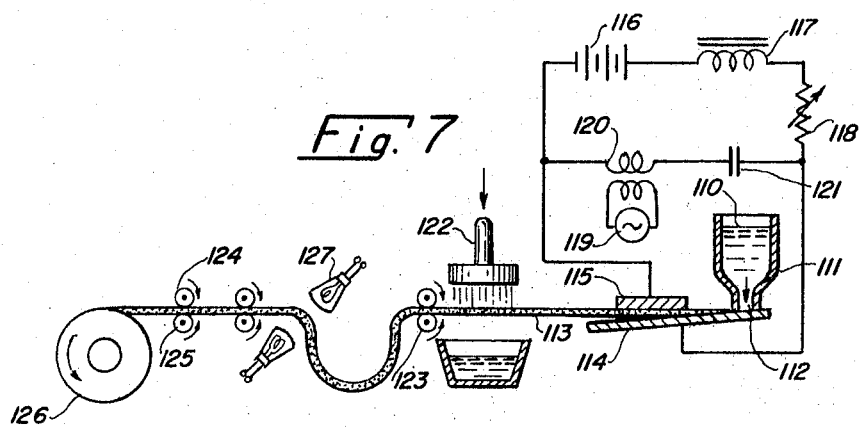
FIG. 7 is a cross-sectional view diagrammatically illustrating an apparatus for producing synthetic-resin film according to this invention.
Figure 8:
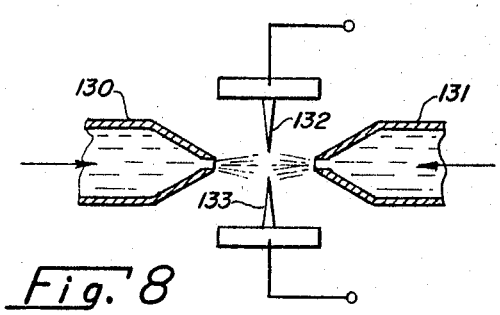
FIG. 8 is a cross-sectional view through a system wherein the kinetic-energy impact occurs between two moving streams of liquid.

As previously indicated, an important feature of this invention resides in the fact that electrical energy can be employed to produce a vinyl-like or styrene-type polymer. In FIG. 7, I show an apparatus whereby the polymer can be produced directly as a film, according to the present invention. In this apparatus, the liquid 110, subjected to the electric field and capable of producing a polymeric material (see Examples I–III supra and Examples VIII, IX below) is received within a vessel 111 and released therefrom at outlet 112 in a thin layer 113 onto a conductive plate 114 constituting an electrode juxtaposed with a counterelectrode 115 in contact with the upper surface of the layer 113. The direct-current component of the electric field developed across the electrodes 114, 115 is supplied by a battery 116 in series with the inductance 117 and a variable resistor 118 while the A.C. component is supplied by a high-frequency generator 119 connected via a transformer 120 and a D.C. blocking capacitor 121 across the electrodes. The polymer is thus formed as a film which is rinsed free of nonpolymeric material by a solvent spray 122 and passes between calendering rollers 123, 124 and 125 prior to being rolled up on a takeup drum 126. The heating lamps 127 are representative of any means for eliminating excess solvent from the film and consolidating the thermoplastic.

Figure 9:
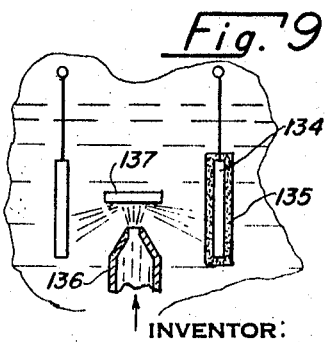
FIG. 9 is a diagrammatic cross-sectional view illustrating another modification of this invention.

In FIG. 1, I show a modification of the system of FIG. 5 wherein the impact energy is derived from a pair of jets emerging from nozzles 130, 131 directed toward one another. The collision between the two moving streams of liquid provides the required impact, a pair of pointed electrodes 132, 133 being juxtaposed laterally of the impact zone for providing the high-energy electric field. These electrodes can be energized by the system 83–88 illustrated in FIG. 5. In the embodiment of FIG. 9, I show a system similar to that of FIG. 5 wherein the cathode 134 is surrounded by a layer of a material 135 which can be collected as described with respect to FIG. 1 after being produced by impact of the stream emerging from nozzle 136 against the plate 137. The electrodes may also be surrounded by a layer of inorganic substance as described with reference to FIG. 3, if it is desired to incorporate fluorine, for example, within the polymer.

EXAMPLE IV

Methacrylic acid is produced (FIG. 6) by bubbling hydrogen cyanide through acetone and applying a high-energy electric field of $10^3$ through $10^5$ volts/cm. between the gas inlet pipe and an electrode plate in solution. A pair of stainless-steel electrode plates are used and a D.C. field of 42 volts/cm. and a current density of about 1 amp./cm.$^2$ is employed between them. 9.6 megacycles/sec. high-frequency alternating current is superimposed upon this direct current and has an amplitude of 21 volt/cm. and a current density of 0.1–0.8 amp./cm.$^2$. Monomeric methacrylic acid is obtained in a yield of about 10% based upon hydrogen-cyanide consumption after about 1 to 4 hours of reaction; about 15 cc. of the monomer is produced.

EXAMPLE V

Propylene ($CH_2=CH-CH_3$) is bubbled through benzene ($C_6H_6$) in a hydrolizing medium (e.g. $H_2O$) with a system similar to that described in Example IV and the D.C. field is 40 volt/cm. while the 8.4 megacycle/sec. high-frequency field is 10 volt/cm. After a period of about 2 hours, 50 cc. of phenol and acetone are obtained directly without the intermediate steps hitherto required.

EXAMPLE VI

When the system of Example V is employed using ethylene as the gas, a D.C. voltage field of 40 volts/cm. and a 6 megacycle/sec. high-frequency A.C. field of 75 volt/cm. with current density on the order of those given in Example IV, approximately 50 cc. of monomeric styrene ($C_6H_5-CH=CH_2$) were obtained in a reaction time on the order of 1 hour.

EXAMPLE VII

With the system illustrated in FIG. 4, benzene is pumped from a 100-liter reservoir into a 50-liter reaction vessel through a nozzle opening of 0.5 mm. diameter at a velocity of about 145 m./sec. The reactant flow rate was 5–10 liter/min. and the reaction vessel contained an aqueous solution of sodium chloride (specific gravity 1.4). A highly viscous dark-brown substances in a mass measured at 5 x 30 x 50 mm. was obtained. The highly viscous mass was extracted with organic solvents (e.g. benzene) to yield 1.2 cc. of a monomeric thermoplastic containing chloride and similar to the vinyl chlorides. A metallic (e.g. stainless-steel) plate was disposed 1 mm. forwardly of the nozzle to provide an impact.

EXAMPLE VIII

The system of Example VII was used except that a pair of electrodes (FIG. 5) was employed at a distance of 30 mm. and a current at a density of 0.5 amp./cm.$^2$ passed between them with a D.C. potential of 80 volts. 500 kc./sec. alternating current of 4.5 volts peak-to peak at 0.5 amp./cm.$^2$ was superimposed upon the D.C. voltage. After 10 minutes reaction time 750 cc. of the dark-brown viscous product of Example VII was obtained, this product being soluble in 7.4 liters of benzene and yielded 3.5 cc. of the vinyl-chloride-like material of Example IV.

EXAMPLE IX

The method of Example VII was followed except that the metallic plate was rotated at a speed of 3100 r.p.m. about its axis and had a diameter of 130 mm. The nozzle velocity was 120 meter/sec. Under these circumstances, the viscous mass, when extracted with benzene, yielded about 1.8 cc. of the vinylchloride-like product.

I claim:

1. A method of chemical synthesis, comprising the step of subjecting organic molecules in a liquid medium to a high-energy force field, thereby activating said molecules and effecting chemical reaction among them, said high-energy force field being at least partly produced by ejecting said medium at a high velocity from a nozzle and causing it to impinge upon a solid body disposed in the path of the medium.

2. A method as defined in claim 1 wherein said medium contacting said body is deflected transversely to said jet by rotating said body about the axis of said jet.

3. A method as defined in claim 1 wherein said high-energy force field is at least partly constituted by an electric field applied across at least a portion of said medium.

4. A method as defined in claim 3 wherein said electric field has a high-frequency alternating current component of substantially 30 kilocycles/sec. to 30 megacycles/sec. and a direct-current component.

5. A method as defined in claim 4, further comprising the step of bubbling an ionized reactant in the gaseous state into said medium.

6. A method as defined in claim 5 wherein said ionized reactant is hydrogen cyanide ionized by subjection to electrical discharge.

7. A method of chemical synthesis, comprising the step of subjecting organic molecules in a liquid medium to a high-energy force field, thereby activating said molecules and effecting chemical reaction among them, said high-energy force field being at least partly produced by ejecting said medium at a high velocity from a nozzle and causing it to impinge upon a solid body disposed in the path of the medium; and applying an electric field having a direct-current component and an alternating-current component across at least part of the medium ejected from said jet.

8. A method as defined in claim 7 wherein said alternating current has at least one high-frequency component at a frequency of substantially 30 kilocycles/sec. to 30 megacycles/sec.

9. A method of producing polymeric material comprising the steps of electrolyzing between a cathodic electrode and an anodic electrode a solution of a high molecular weight compound; applying across said electrodes a unidirectional field upon which is superimposed a high-frequency alternating current to at least partially dissociate said compound and apply thereto an electric charge, the charged portions of said compound drifting in the direction of one of said electrodes having a polarity opposite that of the charged portions; and additively combining charged portions of said compound at said one of said electrodes to produce a polymer.

10. The method defined in claim 9 wherein said high-frequency alternating current has at least two distinct high-frequency components and is the resultant thereof, the frequencies of said components being related to the vibrational resonance frequencies of said compound.

11. The method defined in claim 9 further comprising the step of adding to said solution a substituent ion capable of combination with said polymer, said substituent ion having a charge opposite to that of said one of said electrodes, said substituent ion being a halide selected from the group which consists of fluoride and chloride ions.

12. The method defined in claim 11 wherein said compound is a carbohydrate having a relatively long carbon chain, said solution further comprising an organic electrolyte compatible with said carbohydrate for rendering said solution conductive, said one of said electrodes being constituted of a metal capable of catalyzing the combination of molecular fragments collected at said one of said electrodes under the influence of its electric charge.

13. A polymeric material having a high tensile strength and heat resistance as well as a relatively low optical absorption and produced by cathodic deposition upon a catalytically active electrode upon electrolysis by means of a high-frequency discharge superimposed upon a direct current of an organic carbohydrate solution containing long-chain carbon compounds.

14. A method of synthesizing methacrylic acid from acetone without the formation of intermediates requiring isolation, comprising the steps of bubbling hydrogen cyanide through a reaction medium consisting essentially of acetone in the liquid state, passing through said medium, while said hydrogen cyanide is bubbled therethrough, an electric current having a direct-current component and a high-frequency alternating-current component.

15. A method of synthesizing methacrylic acid from acetone without the formation of intermediates requiring isolation, comprising the steps of bubbling hydrogen cyanide through a reaction medium consisting essentially of acetone in the liquid state; and passing through said medium, while said hydrogen cyanide is bubbled therethrough, an electric current having a direct-current component with a current density of about 1 ampere/cm.$^2$, and a high-frequency alternating-current component with a frequency of substantially 9.6 megacycles/sec. at a current density of substantially 0.1 to 0.8 ampere/cm.$^2$.

16. A method of synthesizing methacrylic acid from acetone without the formation of intermediates requiring isolation, comprising the steps of bubbling hydrogen cyanide through a reaction medium consisting essentially of acetone in the liquid state; ionizing said hydrogen cyanide by electric discharge prior to bubbling it through said medium; and passing through said medium, while said hydrogen cyanide is bubbled therethrough, an electric current having a direct-current component and a high-frequency alternating-current component.

17. A method of synthesizing monomeric styrene, comprising the steps of bubbling ethylene through benzene, and passing through said benzene an electric current having a direct-current component and a high-frequency alternating-current component.

18. A method of synthesizing monomeric styrene, comprising the steps of bubbling ethylene through benzene, and passing through said benzene an electric current having a direct-current component with a field strength of about 40 volts/cm. and a high-frequency alternating-current component with a field strength of about 75 volts/cm. and a frequency of about 6 megacycles/sec.

19. A method of synthesizing a polymeric material, comprising the steps of ejecting a jet of benzene from a nozzle at high velocity and impinging said jet upon a body disposed in the path thereof, and applying an electric field across said path in the region of said body to produce said material, and recovering said material from said jet.

20. A method as defined in claim 19 wherein said body includes a static mass of aqueous solution of an alkali halide.

21. A method as defined in claim 20 wherein said body includes a solid plate disposed forwardly of said nozzle in the path of said jet and having a collision surface extending generally transversely thereto.

22. A method as defined in claim 21, further comprising the step of rotating said plate at an elevated speed about the axis of said jet, said velocity being of the order of 120 meters/sec. and said speed being of the order of thousands of r.p.m.

23. A method as defined in claim 21, further comprising the step of applying an electric field across the liquid emerging from said nozzle, said field having a direct-current component with a current density of about 0.5 ampere/cm.$^2$, and a high-frequency alternating-current with a frequency of the order of 500 kilocycles/sec. and a current density of about 0.5 ampere/cm.$^2$.

24. Apparatus for chemical synthesis, comprising a reaction vessel for a liquid medium containing organic molecules; electrode means spaced apart in said medium for applying an electric field thereto; supply means for applying a high-frequency alternating-current component and a direct current component to said electrode means, nozzle means for introducing a jet of a reactant at high velocity into said medium; and impact means forwardly of said nozzle means for intercepting said jet of said reactant and converting the kinetic energy thereof to an energy for the activation of said reactant.

25. Apparatus for chemical synthesis, comprising a reaction vessel for a liquid medium containing organic molecules; electrode means spaced apart in said medium for applying an electric field thereto; supply means for applying a high-frequency alternating-current component and a direct-current component to said electrode means; nozzle means for introducing a jet of a reactant at high velocity into said medium; impact means forwardly of said nozzle means for intercepting said jet of said reactant and converting the kinetic energy thereof to an energy for the activation of said reactant, said impact means including a plate forwardly of said nozzle means and spaced therefrom while extending transversely to the axis of said jet; and means for rotating said plate.

26. Apparatus for chemical synthesis, comprising a reaction vessel for a liquid medium containing organic molecules; electrode means spaced apart in said medium for applying an electric field thereto; supply means for applying a high-frequency, alternating-current component and a direct-current component to said electrode means; nozzle means for introducing a jet of a reactant at high velocity into said medium; and impact means forwardly of said nozzle means for intercepting said jet of said reactant and converting the kinetic energy thereof to an energy for the activation of said reactant; said electrode means including a pair of electrodes spaced apart on opposite sides of said jet thereof.

27. Apparatus for chemical synthesis, comprising a reaction vessel for a liquid medium containing organic molecules; electrode means spaced apart in said medium for applying an electric field thereto; supply means for applying a high-frequency alternating-current component and a direct-current component to said electrode means; nozzle means for introducing a jet of a reactant at high velocity into said medium; impact means forwardly of said nozzle means for intercepting said jet of said reactant and converting the kinetic energy thereof to an energy for the activation of said reactant, said impact means including a plate forwardly of said nozzle means and spaced therefrom while extending transversely to the axis of said jet; and means for rotating said plate, said electric means including a pair of electrodes spaced apart on opposite sides of said jet transversely thereof.

28. Apparatus for chemical synthesis, comprising a reaction vessel for a liquid medium containing organic molecules; electrode means spaced apart in said medium for applying an electric field thereto; supply means for applying a high-frequency alternating-current component and a direct-current component to said electrode means; nozzle means for introducing a jet of a reactant at high velocity into said medium; impact means forwardly of said nozzle means for intercepting said jet of said reactant and converting the kinetic energy thereof to an energy for the activation of said reactant, said impact means including a plate forwardly of said nozzle means and spaced therefrom while extending transversely to the axis of said jet; means for rotating said plate, said electrode means including a pair of electrodes spaced apart on opposite sides of said jet transversely thereof; circulating means for flowing a product-removal stream of liquid across the surface of said liquid medium for entraining a product of the synthesis reaction therewith; and separating means for extracting said product from said stream of liquid during the recirculation thereof.

References Cited

UNITED STATES PATENTS

| | | | |
|---|---|---|---|
| 2,257,177 | 9/1941 | Luster | 204—168 |
| 2,334,377 | 11/1943 | Bennett | 204—164 |
| 2,415,067 | 1/1947 | Wallace | 204—275 |
| 2,583,899 | 1/1952 | Smith | 204—168 |
| 2,632,729 | 3/1953 | Woodman | 204—72 |
| 2,726,204 | 12/1955 | Park et al. | 204—72 |
| 2,939,828 | 6/1960 | Hausner | 204—228 |

HOWARD S. WILLIAMS, *Primary Examiner.*

H. M. FLOURNOY, *Assistant Examiner.*

U.S. Cl. X.R.

204—72, 194, 228